Patented Mar. 24, 1925.

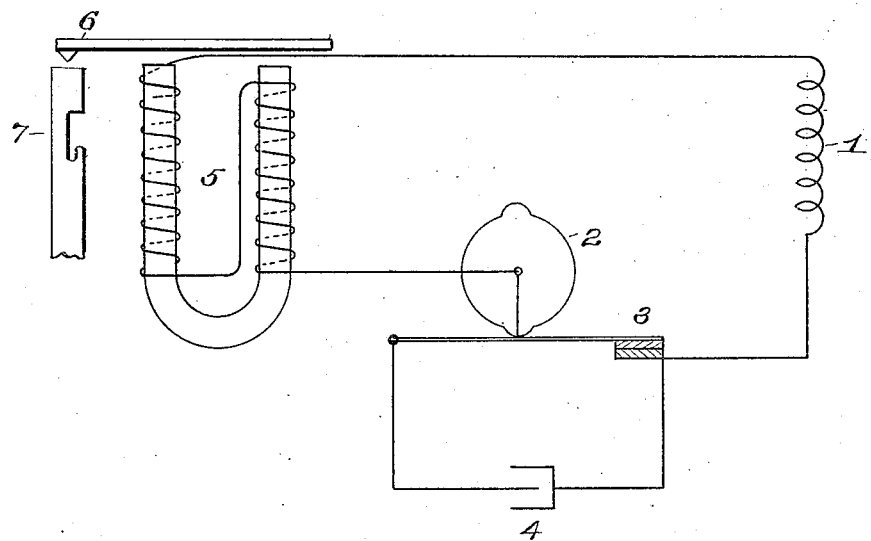

1,530,700

UNITED STATES PATENT OFFICE.

HERBERT O. RUSSELL AND WALLACE R. FLETCHER, OF DAYTON, OHIO.

ELECTRICAL SYNCHRONIZER AND TRIGGER MOTOR FOR AUTOMATIC MACHINE GUNS.

Application filed August 8, 1921. Serial No. 490,774.

*To all whom it may concern:*

Be it known that we, HERBERT O. RUSSELL and WALLACE R. FLETCHER, citizens of the United States, residing at Dayton, in the county of Montgomery and State of Ohio, have invented certain new and useful Improvements in Electrical Synchronizers and Trigger Motors for Automatic Machine Guns, of which the following is a specification.

This invention relates to electrical systems in general, and more particularly to an electrical device adapted to so time the firing of a machine gun that it may be fired between the rotating blades of an aircraft propeller at any and all speeds thereof.

In the conventional type of synchronizing systems, rigid, liquid, or mechanically semi-flexible connections are made between the gun and the source of mechanical energy, and the adjustments are so made that the gun fires immediately after the propeller passes at low speed of rotation. As this speed of rotation increases, the lag of firing with relation to the rotation of the propeller becomes greater, and upon excessive speed thereof, the propeller again approaches the line of fire, as will be seen.

It is therefore proposed to provide such a device that will permit of more flexibility and ease of installation as well as perfect control over the entire system at all times. It is further proposed to use the generated, available, and time fixed value of the electric current to energize an electro-magnet. The direct mechanical action of the energized electro-magnet will cause a trigger to mechanically strike the sear release or other initial mechanical release of the machine gun. The remaining mechanical movements up to and including the actual firing of the projectile, will follow in sequence thereafter. There is no electrical control over the timing of these latter movements and as a result they are not taken into account except in so far as to reduce their time lag mechanically to a minimum.

It is also proposed to provide an electrical system of gun fire control in which the over-all time lag of the various parts, which must act successively from the making of the current in the main trigger motor circuit to the passage of the projectile through the plane of the rotating propeller, is so small that no regulation of the phase in which the firing takes place in relation to the position of the propeller is necessary as the speed of the propeller changes.

With the foregoing and other objects in view which will appear as the description proceeds, the invention resides in the combination of parts and in the details of construction hereinafter described and claimed, it being understood that changes in the precise embodiment of the invention herein disclosed may be made within the scope of what is claimed, without departing from the spirit of the invention, as disclosed in the accompanying drawings, in which:

The figure illustrates diagrammatically the electrical circuit from the source of electrical energy to the sear release.

The device consists mainly of two parts: the source of electrical energy and the electro-magnet trigger motor. The source of electrical energy consists of an alternating current dynamo, having separately excited or permanent fields. Intact with the dynamo circuit is a cam and a spring actuated breaker mechanism with a condenser connected across the breaker points. The current from the dynamo, which is taken off at values regulated by the cam, is used to actuate a quick acting electro-magnet of the U shape type, or a modification thereof. A control switch is placed in the main circuit to put the entire device into or out of operation at the will of the operator.

The sequence and progress of the operation of this device is as follows: 1 is the source of electrical energy, 2 the cam, 3 the breaker points, and 4 the condenser. The cam and breaker points assembly is attached directly to the dynamo shaft. The shaft, in turn, is directly connected to and rotated by the engine cam shaft (not shown). The cam 2 is so set as to cause the breaker points 3 to close the circuit through the electro-magnet trigger motor 5 when a maximum value of current and voltage is generated in the dynamo. Armature 6 is magnetically attracted by the electro-magnet when the latter is electrically energized. The trigger 8, of the armature 6, then strikes the sear release 7. By any suitable means the sear release 7 may be so arranged in an automatic machine gun that the sear release will be immediately disengaged by said sear release, and also the firing pin which finally fires the cartridge. This cycle of operation occurs twice during each complete revolution of the propeller in case a two-bladed propeller and a two-lobe cam are used.

By using a source of electrical energy as before set forth, viz., an alternating current dynamo having a separately excited field or a magneto having a permanent field, it will be obvious that the voltage generated at any instant will be proportional to the speed of rotation of the propeller when this dynamo is driven from the engine in the ordinary manner. Obviously then, the lag of firing with relation to the rotation of the propeller would not be as great at high speeds when the voltages are high than it would if a constant voltage equal to the low speed voltage were maintained. The lag of firing would naturally increase slightly at the higher speeds using a generator having a constant field strength as above set forth over that obtained at low speeds, but this increase would be very slight due to the fact that the voltages at higher speeds would cause faster operation of the electrical parts due to the production of greater power from these higher voltages.

A magneto or a similar source of electrical energy having a constant field strength has been found to be highly desirable in use upon aircraft for this purpose due to its light weight as compared with other practical methods of producing a similar voltage and power and also, and most important, because of the character of the generation of voltage and current which is characteristic of a generator of this kind. It has been found that the electrical lag due to the comparatively small time taken to generate a sufficient amount of current to operate electrical devices after the circuit has been closed is much less in a generator of this character than in other known methods of electrical generation.

We claim:

1. A device adapted for use in timing the firing of automatic airplane firearms in phase with the rotation of airplane propellers, comprising a source of electrical energy, a contact closer having breaker points, and an electromagnet, all connected in series, said source of electric energy comprising an alternating current generator having a constant field strength, a condenser connected across the contact closer, means operating in synchronism with the rotation of the propeller for bringing said contact points into contact with each other at a time when the voltage of said source is at a maximum value, a sear release, and means for tripping said sear release when said breaker points are closed and said electromagnet energized.

2. A device adapted for use in timing the firing of automatic airplane firearms in phase with the rotation of airplane propellers comprising a source of electrical energy, a contact closer having breaker points, and an electromagnet all connected in series, said source of electrical energy comprising an alternating current generator having a constant field strength, means operating in synchronism with the rotation of the propeller for bringing said breaker points into contact with each other, at a time when the voltage of the said source is at a maximum value, a sear release, and means for tripping said sear release when said breaker points are closed.

3. A device adapted for use in timing the firing of automatic airplane firearms in phase with the rotation of an airplane propeller comprising a source of electrical energy, a contact closer having breaker points, and an electromagnet all connected in series, said source of electrical energy comprising an alternating current generator having a constant field strength, a condenser connected across the contact closer, means operating in synchronism with the rotation of the propeller for bringing said breaker points into contact with each other, a sear release, and means for tripping said sear release when said breaker points are closed.

In testimony whereof we have affixed our signatures.

HERBERT O. RUSSELL.
WALLACE R. FLETCHER.